UNITED STATES PATENT OFFICE.

MAX MOELLER, OF BERLIN, GERMANY, ASSIGNOR TO THE ACTIEN-GESELLSCHAFT FÜR ANILIN FABRIKATION, OF SAME PLACE.

BLUE DYE.

SPECIFICATION forming part of Letters Patent No. 521,986, dated June 26, 1894.

Application filed January 16, 1894. Serial No. 497,096. (Specimens.) Patented in France April 12, 1893, No. 229,339.

*To all whom it may concern:*

Be it known that I, MAX MOELLER, of Berlin, in the Kingdom of Prussia, German Empire, have invented new and useful Improvements in the Production of Blue Dye, (for which French Patent No. 229,339, dated April 12, 1893, has been granted;) and I do hereby declare that the following is a full, clear, and exact description of the invention, which will enable others skilled in the art to which it appertains to make and use the same.

The invention relates to the production of a new azo-dye containing as component the 1.8 amido-naphtoldisulfoacid—described in my application, Serial No. 466,691, dated March 18, 1893, which is prepared by transforming the alpha naphtylamindisulfoacid, mentioned in the German Patent No. 40,571 into alpha naphtylamintrisulfoacid and converting the latter into the amidonaphtoldisulfoacid by melting with caustic alkalies. This new 1.8 amidonaphtoldisulfoacid I have found to be extraordinarily fit for the production of valuable blue dyestuffs derived from the compounds of paradiamins.

The following example will show the manner in which I may practically carry out my invention: 24.4 kilograms diamidodiphenolether are converted into tetrazodiphenyl-salt in the well known manner and the solution of the latter is poured into a solution of seventy-three kilograms 1.8 amidonaphtoldisulfonate of soda kept alkaline by the addition of carbonate of soda. A blue-black precipitate is formed immediately, which afterward dissolves for the greatest part with blue color. After standing for about twelve hours under repeated stirring the mixture is gently heated and the coloring matter is precipitated by means of common salt, filtered, pressed and dried. It forms an amorphous dark-brown powder of metallic luster, which dissolves easily in water with greenish blue color, that turns into violet-blue by the addition of caustic soda-lye. From the aqueous solution of the dyestuff the free color-acid is precipitated by adding concentrated mineral acid, while acetic acid produces no precipitate.

The dyestuff is nearly insoluble in alcohol; in concentrated sulfuric acid it dissolves with indigo-blue color, on diluting with water this solution turns at first into violet-blue, and then the color acid separates in the shape of dark blue flakes.

The dyestuff dyes unmordanted cotton in an alkaline or neutral bath containing common salt or glauber-salt a pure greenish-blue; it may also be fixed on wool in a slightly acidulated dye bath.

The following alterations may be made in the above example without materially changing the character of the product obtained. I may combine the tetrazo derivative at first only with one molecule of the 1.8 amidonaphtoldisulfoacid in order to form an intermediate product and react afterward with the latter upon phenols, amins or their sulfo- or carbo-acids. For instance by combining the intermediate product resulting from 24.4 kilograms diamidodiphenolether and 36.5 kilograms 1.8 amidonaphtoldisulfonate of soda with 24.4 kilograms alpha naphtol alpha monosulfonate of soda a dyestuff is produced which dyes unmordanted cotton also a pure blue shade.

Having now described my invention, what I claim is—

The blue dyestuff derived from 1.8 amidonaphtoldisulfoacid and the tetrazo compound of diamidodiphenolether and having the constitutional formula

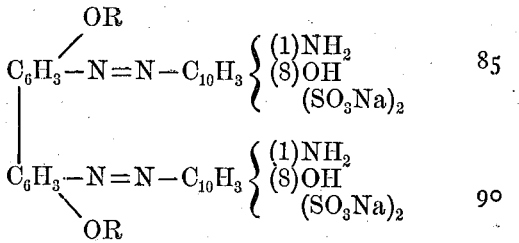

(in which formula R signifies methyl or ethyl) said dye being easily soluble in water, nearly insoluble in alcohol, dissolving with indigo-blue color in strong sulfuric acid, which solution turns at first violet-blue on diluting with water and from which then the
5 free color-acid separates in the form of a dark-blue precipitate—substantially as set forth.

In testimony whereof I hereunto set my hand and affix my seal, in the presence of two witnesses, this 23d day of December, A. D. 1893.

MAX MOELLER. [L. S.]

Witnesses:
OSCAR WEBER,
GUSTAV LUCHT.